United States Patent
Eckhardt

(10) Patent No.: US 7,028,720 B2
(45) Date of Patent: Apr. 18, 2006

(54) SEALING DEVICE

(75) Inventor: Arnold Eckhardt, Randstadt (DE)

(73) Assignee: Sumitomo Rubber Industries, Ltd., Kobe (JP)

(*) Notice: Subject to any disclaimer, the term of this patent is extended or adjusted under 35 U.S.C. 154(b) by 239 days.

(21) Appl. No.: 10/333,651

(22) PCT Filed: Mar. 7, 2001

(86) PCT No.: PCT/EP01/02564

§ 371 (c)(1),
(2), (4) Date: Apr. 17, 2003

(87) PCT Pub. No.: WO01/72504

PCT Pub. Date: Oct. 4, 2001

(65) Prior Publication Data

US 2004/0000365 A1  Jan. 1, 2004

(30) Foreign Application Priority Data

Mar. 27, 2000 (DE) .............................. 100 15 166

(51) Int. Cl.
*B65B 1/04* (2006.01)

(52) U.S. Cl. ..................... 141/38; 141/67; 152/154.1

(58) Field of Classification Search .................. 141/1, 141/4, 5, 9, 38, 67, 100, 102, 105, 329, 330; 152/154.1; 137/625, 625.4, 597
See application file for complete search history.

(56) References Cited

U.S. PATENT DOCUMENTS

| 6,283,172 B1 * | 9/2001 | Thurner ...................... 141/38 |
| 6,668,875 B1 * | 12/2003 | Kojima et al. ................. 141/38 |
| 6,766,834 B1 * | 7/2004 | Eckhardt ....................... 141/38 |

FOREIGN PATENT DOCUMENTS

| DE | 3635574 | 4/1988 |
| DE | 19652546 | 9/1998 |
| DE | 19846451 | 4/2000 |
| EP | 0753420 | 1/1997 |

* cited by examiner

*Primary Examiner*—Steven O. Douglas
(74) *Attorney, Agent, or Firm*—Gifford, Krass, Groh, Sprinkle, Anderson & Citkowski, P.C.

(57) ABSTRACT

The invention relates to an apparatus for the sealing of inflatable articles, in particular tyres, comprising a container containing a sealant and an extraction unit releasably connected and preferably screwed to the container, the extraction unit having at least one inlet line connectable to a source of gas pressure and at least one outlet line capable of being coupled to the article to be sealed, wherein ends of the lines which project into the container are sealed in a fluid tight manner relative to the inner space of the container by a closure arrangement which can be removed and in particular blown off by means of gas pressure.

16 Claims, 2 Drawing Sheets

SEALING DEVICE

Figure 1:
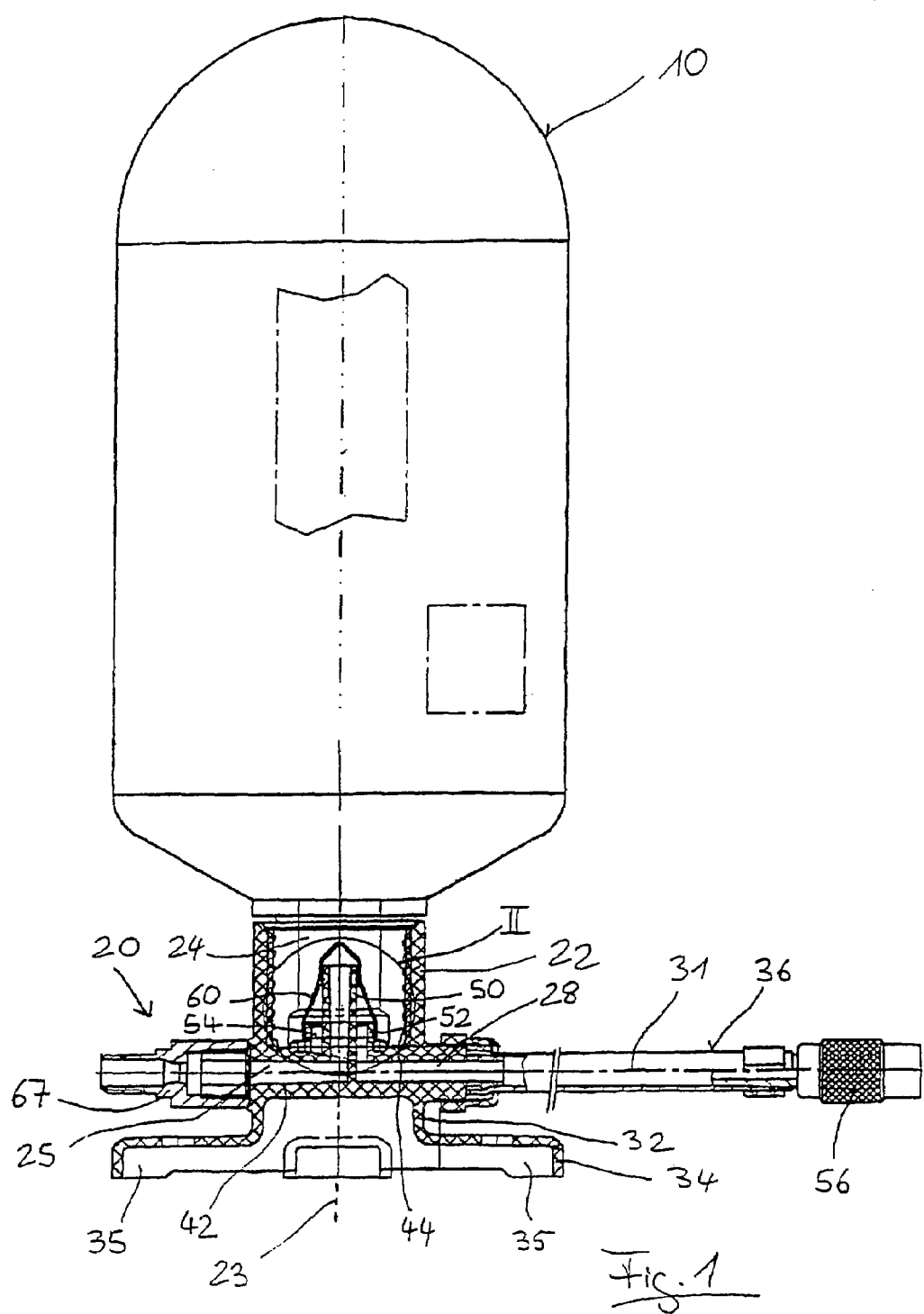

The invention relates to an apparatus for the sealing of inflatable articles, in particular tyres, comprising a container containing a sealant and an extraction unit releasably connected and preferably screwed to the container, the removal unit having at least one inlet line connectable to a source of gas pressure and at least one outlet line capable of being coupled to the article to be sealed.

Such apparatuses are known and serve to seal a leak in the inflatable article, for example in a punctured tyre or a tyre damaged during travel, in that a special sealant is introduced into the tyre via the tyre valve and the tyre is subsequently pumped up to a pressure. at which it can be driven.

The German patent application 198 46 451.7, with the application date of 8 Oct. 1998, describes such a sealing apparatus.

It is the problem (object) underlying the invention to further develop an apparatus of the kind initially named such that it can be handled in the simplest possible manner.

This object is satisfied by the features of the invention and in particular by ends of the lines projecting into the container being sealed in a fluid tight manner relative to the inner space of the container by a closure arrangement which can be removed and in particular blown off by means of gas pressure.

In accordance with the invention, the closure arrangement provides that the sealant contained in the container cannot flow out via the inlet line and the inlet line even when the extraction unit is coupled to the container. To commence use of the sealing apparatus, it is only necessary to remove or blow off the closure arrangement, whereupon the sealing apparatus is immediately ready for operation. The invention allows the closure arrangement to be removed by applying a gas pressure to the inlet line and/or the outlet line. The gas pressure, which is anyway required for the operation of the sealing apparatus and which can be applied via the inlet line from the source of gas pressure, preferably serves this purpose. It is therefore only necessary to activate the source of gas pressure connected to the inlet line to put the apparatus into operation, whereupon the closure arrangement is automatically removed or blown off and the sealant is pressed into the article to be sealed via the pressure building up in the container. A substantial advantage of the invention lines in the fact that the sealing apparatus can be stored, for example in a vehicle, in a completely pre-assembled manner in a state ready for operation, i.e. with the container connected, i.e. screwed, to the extraction unit. The invention is thus extremely convenient to use.

It is preferred if the closure arrangement is formed in one piece and in particular in a cap-like manner. When not in use, the ends of both the inlet line and the outlet line are thus simultaneously sealed in a fluid tight manner by a closure means formed, for example, as a cover cap.

The closure arrangement, i.e. the cover cap, can be pushed or plugged onto at least one line end. The closure arrangement is clamped to the line end or line ends by, for example, clamping forces and/or latching. A secure and permanent fluid tight covering of the line ends in the pre-use state can thus be ensured by such couplings between the closure arrangement and the extraction unit.

In a particularly preferred embodiment of the invention, the line ends extend coaxially to one another at least regionally, with the one line end projecting beyond the other line end into the container and the closure arrangement having two axially spaced sealing sections which respectively cooperate with one line end. The closure arrangement, provided for example in the form of a cover cap, can here cooperate in the region of its free end with the line end which projects less far into the container, whereas the line end, which projects further into the container and thus into the closure arrangement, preferably the inlet end line, is sealed by a region situated closer to the closed end of the closure arrangement.

Figure 2:
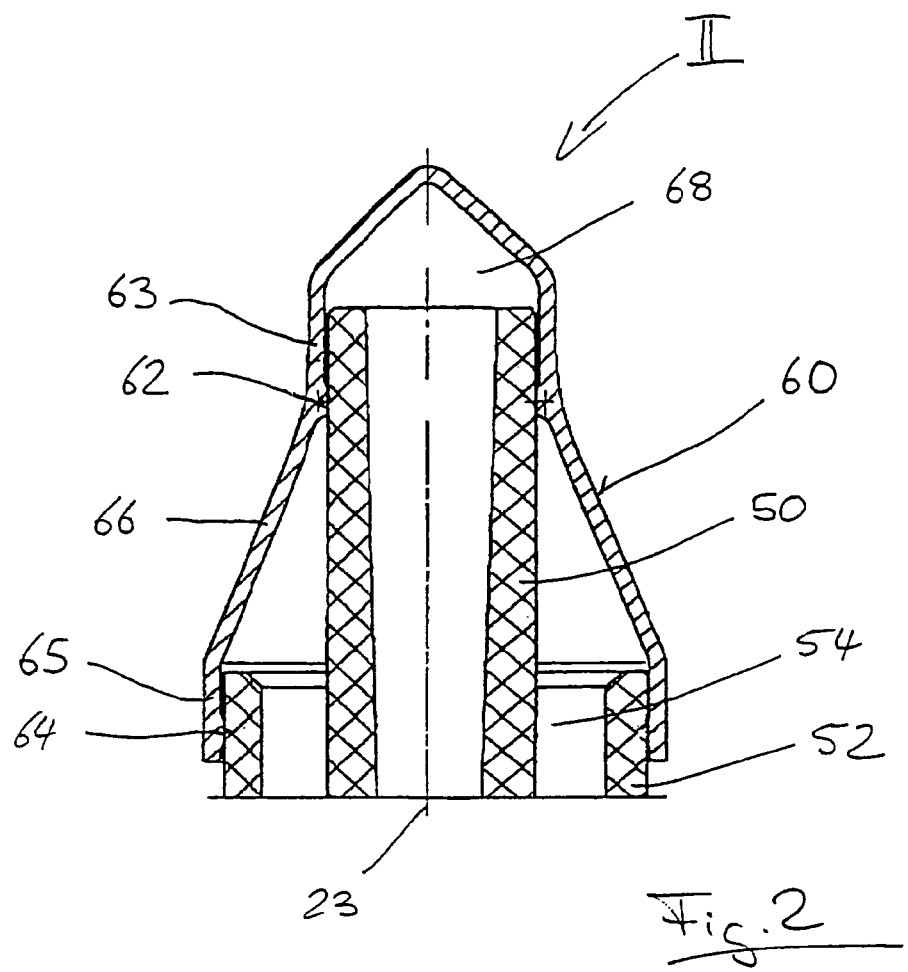

Further preferred embodiments of the invention are also given in the dependent claims, the description and the drawing. dr The invention is described in the following by way of example with reference to the drawing, in which are shown:

FIG. 1 a sectioned side view of a sealing apparatus in accordance with an embodiment of the invention; and FIG. 2 in an enlarged section II of FIG. 1, a closure arrangement of the sealing apparatus sealing line ends.

In accordance with FIG. 1, the sealing apparatus comprises a pressure-resistant container 10 which is shaped in bottle-like form, is made of recyclable plastic and has an approximately cylindrical connection section 24 which is formed in the manner of a bottleneck and which is termed a neck in the following.

The neck 24 is provided with a thread at its outer side which allows the container 10 to be screwed into a connection stub 22 of a pressure-resistant extraction unit 20, which has a matching inner thread, which is formed as one piece and which is also made of recyclable plastic, such that the inner space of the container is sealed with respect to the environment.

The connection stub 22 of the extraction unit 20 and the neck 24 of the container 10 have approximately the same length.

The neck 24 of the container 10 can be formed in such a manner that an adapter element formed as a Venuri nozzle can be introduced, in particular screwed, into the neck 24.

The container 10 contains a liquid sealant such as is described, for example, in the German patent application 196 52 546. The container 10 can be designed, for example, to receive a volume of 700–800 ml, but also for a lower filling volume of, for example, 450 ml or a greater filling volume of, for example, 800 ml. In its original state prior to its first use, the container 10 is preferably filled completely with the sealant without the inclusion of air so that no disturbing skin formation can occur. Generally, however, it is also possible to provide the container 10 only partly filled in the original state.

The connection stub 22 forms a free end of a cylindrical connection section 32 of the extraction unit 20 and the connecting section 32 broad out in a radial direction at its end remote from the container 10 to form a foot section 34 which comprises four feet 35 extending in a star-like manner in a radial direction away from the connection section 32. The maximum radial dimension of the foot section 34 amounts to more than twice the diameter of the connection section 32, whereby a secure standing position of the sealing apparatus is ensured.

Two base plates 42, 44 are arranged spaced from one another in the connection section 32 of the extraction unit 20 and separate the foot section 34 from the connection stub 22. At the upper base plate 44, the container 10 contacts the edge of the connection section 24 bounding an opening of the container 10 in a fluid tight manner in the screwed state in accordance with FIG. 1.

Inner sections of an inlet line 25 or of an outlet line 28, whose lower and upper bounding wall is formed in each case by the lower and upper base plate 42 and 44 respectively, extend in the radial direction between the two base plates 42, 44.

The inner sections each merge into an outer section outside the connection section 32 of the extraction unit 20. The central axes of the inn sections and the outer sections lie on a common longitudinal axis 31.

The outer section of the inlet line 25 is formed as a gas inlet and is provided with a pressure relief valve and non-return valve 67 in the accordance with FIG. 1 which has a thread for connection to a source of gas pressure (not shown).

The outer section of the outlet line 28 is connected to a filling line 36 provided in the form of a hose via which the sealing apparatus can be coupled to an article to be sealed.

The end of the inlet line 25 adjoining the inner section forms an inflow passage 50 whose longitudinal axis coincides with the longitudinal axis 23 of the connection stub 22. The inflow passage 50 protrudes into the connection stub 22 of the extraction unit 20 and thus into the neck 24 of the container 10, which is screwed on, with the inflow passage 50, however, not extending beyond the free end of the connection stub 22.

The inflow passage 50 is arranged regionally on the inside of a removal or extraction passage 52 formed by the end of the outlet line 28, said extraction passage 52 concentrically surrounding the inflow passage 50 so that the inflow passage 50 and the extraction passage 52 form a coaxial line system and an annular space 54 is created to which the inner section of the outlet line 28 is connected.

A closure arrangement in the form of a cover cap 60 is pushed onto the coaxial line system formed by the inflow passage 50 and the extraction passage 52 and the inflow passage 50 and the extraction passage 52, and thus the ends of the inlet line 25 and the outlet line 28, are sealed in a fluid-tight manner by this cap. In this way, the sealant is also not able to enter the inlet line 25 and the outlet line 28 in the pre-use state in accordance with FIG. 1 when the container 10 is screwed into the c stub 22, for example, in an inverted position.

The enlarged representation of FIG. 2 shows that the cover cap 60 is provided in the vicinity of two axially spaced wall sections 63, 65, which extend parallel to the longitudinal axis 23 with sealing sections 62, 64, each in the form of a peripheral sealing rib or sealing lip by which the cap 60 is located in a clamped sealing engagement with the outer wall of the respective line end 50, 52. While the wall section 65 sealing the extraction passage 52 is situated at the open end of the cap 60 and bounds the cap opening, the wall section 63 provided to seal the inflow passage 50 is located closer to the closed end of the cap 60. The two wall sections 63, 65 are connected to one another via a wall section 66 extending obliquely to the longitudinal axis 23 so that the cover cap 60 has a funnel-like shape in the embodiment shown.

The cover cap 60 is preferably made of plastic and is elastically deformable such that it is flared when pushed onto the line system 50, 52 and thus the sealing ribs or sealing beads formed in the region of the wall sections 63, 65 are pressed against the line ends 50, 52. A fluid tight clamping fit of the cap 60 on the line system 50, 52 is ensured by this pre-stress of the sealing sections 62, 64.

It can moreover be seen from FIG. 2 that the free inner cross-sectional area of the inlet line 25 increases in the region of the line end forming the inflow passage 50 in the direction of the free end.

The filling line 36 formed as a hose is provided at its free end with a sleeve nut 56 matching, for example, a VG8 valve thread in order to enable the filling line 36 to be connected, for example, to a tyre to be sealed. The filling line 36 can be connected either releasably or fixedly to the extraction unit 20.

The source of gas pressure connectable to the inlet line 25 is preferably formed to provide compressed air and can be formed, for example, as a small compressor, a motor vehicle central compressor, a stationary compressed air supply unit or a portable pressure storage container such as are available at filling stations, or as a manually operated air pump or a foot pump. The maximum pressure to be supplied by the source of gas pressure does not need to be greater than the pressure required for at least emergency operation of the tyre. The source of gas pressure does not need to supply any specific minimum pressure to empty the container 10.

The manner of operation of the sealing apparatus in accordance with the invention is described in the following by way of the example of a tyre to be sealed. Reference is made to the German patent application 198 46 451.7 with the application date of 8 Oct. 1998 with respect to the functional principal and the advantageous embodiments, uses and applications of the sealing apparatus in accordance with the invention, and the content of the German application is incorporated into the present application by way of reference.

The filling line 36 connected to the outlet line 28 of the extraction unit 20 is first connected to the valve of the tyre. The source of gas pressure can already be connected to the extraction unit 20 or still be separated from it.

Any residual pressure still present in the tyre can escape via a valve (not shown) arranged either in the filling line 36, in the extraction unit 20 or in the container 10. It is also possible to first connect the filling line 36 to the tyre and only then to the extraction unit 20 when the residual pressure has escaped from the tyre via the filling line 36.

The sealing apparatus in accordance with the invention can be set with the extraction unit 20 on the ground, as is shown in FIG. 1, so that the container 10 is arranged with its opening facing down, for the introduction of sealant into the tyre. Due to the cover cap 60, no sealant can flow out via the inlet line 25 and the outlet line 28.

On activation of the source of gas pressure, the gas flows through the inlet line 25 and from its end forming the inflow passage 50 into a pressure space 68 bounded on the container side by the closed end of the cover cap 60. As soon as the pressure prevailing in the inlet line 25 and in the pressure space 68 exceeds a certain value dependent on the clamping force holding the cover cap 60 on the line system 50, 52, the cap 60 is blown off and pushed into the container 10.

After the extraction or blowing off of the cap 60, the gas can enter the container 10 via the inflow passage 50 and can enter the region above the sealant level through the sealant. The gas, which is under elevated pressure in this region, presses the sealant through the filling line 36 into the tyre via the annular space 54 of the outlet line 28 formed by the inflow passage 50 and the extraction passage 52. The neck 24 of the container 10 can be designed and, for example, provided with a restriction such that it has an advantageous effect on the course of the sealant flow.

The sealant is also driven out of the container 10 via the extraction passage 52 of the outlet line 28 in the case of a container 10 completely filled and without air inclusion due to the pressure rise caused by the gas flowing into the container 10.

The flow of the sealant during operation out of the container 10 into the extraction passage 52 of the outlet line 28 is not impaired in any way by the blown off cap 60 located in the container 10.

A substantial advantage of the invention is that the container 10 and the extraction unit 20 do not need to be coupled only directly prior to the sealing procedure. Instead the sealing apparatus in accordance with the invention can be stored and transported ready for operation. This user-friendly state can be created, for example, by the manufacturer.

After the complete emptying of the container 10, a new container filled with sealant can be coupled to the extraction unit 20, with a new cover cap previously being pushed onto the line ends 50, 52. The sealing apparatus is then prepared for the next sealing procedure and can again be stored and transported without problem due to the security against running out ensured by the cap 60.

| Reference numeral list | |
|---|---|
| 10 | container |
| 20 | extraction unit |
| 22 | connection stub |
| 23 | longitudinal axis of the connection stub |
| 24 | connection section or neck of the container |
| 25 | inlet line |
| 28 | outlet line |
| 31 | longitudinal axis |
| 32 | connection section of the extraction unit |
| 34 | foot section |
| 35 | foot |
| 36 | filling line |
| 42 | lower base plate |
| 44 | upper base plate |
| 50 | end of the inlet line, inflow passage |
| 52 | end of the outlet line, extraction passage |
| 54 | annular space |
| 56 | sleeve nut |
| 60 | closure arrangement, cover cap |
| 62 | sealing section |
| 63 | wall section |
| 64 | sealing section |
| 65 | wall section |
| 66 | wall section |
| 67 | pressure relief and non-return valve |
| 68 | pressure space |

What is claimed is:

1. Apparatus for the sealing of inflatable articles, in particular tyres, comprising a container (10) containing a sealant and an extraction unit (20) releasably connected to the container (10), the extraction unit having at least one inlet line (25) connectable to a source of gas pressure and at least one outlet line (28) capable of being coupled to the article to be sealed, wherein ends (50, 52) of the lines (25, 28) which project into the container (10) are sealed in a fluid tight manner relative to the inner space of the container by a removable closure arrangement (60).

2. Apparatus in accordance with claim 1, characterized in that the closure arrangement (60) is formed in one piece and in particular in cap-like manner.

3. Apparatus in accordance with claim 1, characterized in that the closure arrangement (60) is pushed or plugged onto at least one line end (50, 52).

4. Apparatus in accordance with claim 1, characterized in that the closure arrangement (60) is clamped onto at least one line end (50, 52) and/or latched to the line end (50, 52).

5. Apparatus in accordance with claim 1, characterized in that the closure arrangement (60) has at least one preferably rib-like sealing section (62, 64) which contacts the outer wall of at least one line end (50, 52).

6. Apparatus in accordance with claim 1, characterized in that the closure arrangement (60) is prestressed into sealing engagement with at least one line end (50, 52) and is in particular elastically deformable by attachment to the extraction unit (20).

7. Apparatus in accordance with claim 1, characterized in that the line ends (50, 52) extend co-axially at least regionally, with the one line end (50) preferably projecting beyond the other line end (52) into the container (10).

8. Apparatus in accordance with claim 1, characterized in that the closure arrangement (60) is made at least approximately rotationally symmetrical.

9. Apparatus in accordance with claim 1, characterized in that the closure arrangement (60) has two axially spaced apart sealing sections (62, 64) which respectively cooperate with one line end (50, 52).

10. Apparatus in accordance with claim 1, characterized in that the sealing sections (62, 64) of the closure arrangement (60) are formed in the region of wall sections (63, 65) which extend approximately axially parallel and are connected together by a wall section (66) extending obliquely to the line axis.

11. Apparatus in accordance with claim 1, characterized in that the extraction unit (20) for the container (10), which is in particular flask-like container (10), preferably has at least one substantially cylindrical connection stub (22) to receive a connection section (24) of the container (10) resembling a flask neck.

12. Apparatus in accordance with claim 1, characterized in that the inlet line (25) and outlet line (28) each merge into the respective line end (50, 52) via an inner section from which the respective line end (50, 52) preferably projects at right-angles and include an outer section which can be respectively connected with the gas pressure source or coupled to the article to be sealed, with the inner sections preferably extending approximately parallel and the outer sections approximately perpendicular to a longitudinal axis (23) of a connection stub (22) of the extraction unit (20).

13. Apparatus in accordance with claim 1, characterized in that the line ends (50, 52) extend within a connection stub (22) of the extraction unit (20) and preferably do not extend beyond the free end of the connection stub (22).

14. Extraction unit having the features of claim 1 relating to an extraction unit (20) and a closure arrangement (60).

15. Apparatus in accordance with claim 1 wherein said extraction unit is releasably connected to said container by a threaded connection.

16. Apparatus in accordance with claim 1 wherein said removable closure unit can be removed and blown off by means of gas pressure.

* * * * *